United States Patent
Butler et al.

(10) Patent No.: US 9,697,245 B1
(45) Date of Patent: Jul. 4, 2017

(54) DATA-DEPENDENT CLUSTERING OF GEOSPATIAL WORDS

(71) Applicant: INTERNATIONAL BUSINESS MACHINES CORPORATION, Armonk, NY (US)

(72) Inventors: Christopher J. Butler, Hawthorn East (AU); Qiang Chen, Beijing (CN); Bo Han, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/984,397

(22) Filed: Dec. 30, 2015

(51) Int. Cl.
*G06F 17/00* (2006.01)
*G06F 17/30* (2006.01)

(52) U.S. Cl.
CPC .... *G06F 17/3033* (2013.01); *G06F 17/30705* (2013.01); *G06F 17/30707* (2013.01); *G06F 17/30876* (2013.01)

(58) Field of Classification Search
CPC ................ G06F 17/30705; G06F 17/30707
USPC ........................................ 707/747, 739, 750
See application file for complete search history.

(56) References Cited

U.S. PATENT DOCUMENTS

| | | | | |
|---|---|---|---|---|
| 8,326,820 B2* | 12/2012 | Li | ....................... | G06F 17/3028 707/708 |
| 8,762,393 B2* | 6/2014 | Lee | .................. | G06F 17/30592 707/730 |
| 9,305,264 B2* | 4/2016 | Anguera | ................. | G10L 15/12 |
| 2013/0034337 A1* | 2/2013 | Hefeeda | ................ | H04N 5/913 386/252 |

OTHER PUBLICATIONS

Alexis Joly and Olivier Buisson . Random maximum margin hashing. In Computer Vision and Pattern Recognition (CVPR), 2011 IEEE Conference on, pp. 873-880. IEEE, 2011.
Benjamin P. Wing and Jason Baldridge. Simple supervised document geolocation with geodesic grids. In Proceedings of the 49th Annual Meeting of the Association for Computational Linguistics : Human Language Technologies(ACL HLT 2011), pp. 955-964.
Brian Kulis, Prateek Jain, and Kristen Grauman. Fast similarity search for learned metrics. Pattern Analysis and Machine Intelligence, IEEE Transactions on, 31(12): pp. 2143-2157, 2009.
J. Leskovec, A. Rajaraman, and J.D. Ullman. Mining of Massive Datasets. Cambridge University Press, 513 pages, 2014.

(Continued)

*Primary Examiner* — Marc Filipczyk
(74) *Attorney, Agent, or Firm* — Cantor Colburn LLP; Louis Percello (57) ABSTRACT

Embodiments include method, systems and computer program products for data-dependent clustering of geospatial words. In some embodiments, a matrix of words and locations may be obtained. A plurality of locality-sensitive hash (LSH) functions may be generated. A plurality of sparse row vectors may be generated. A plurality of sparse LSH functions may be generated based on the plurality of LSH functions. A clustering bucket may be determined from a plurality of clustering buckets for each of the plurality of sparse row vectors using the sparse LSH functions.

17 Claims, 4 Drawing Sheets

(56) References Cited

OTHER PUBLICATIONS

Jacob Eisenstein. What to do about bad language on the Internet. In Proceedings of the 2013 Conference of the North American Chapter of the Association for Computational Linguistics: Human Language Technologies (NAACLHLT 2013), pp. 359-369, Atlanta.

Malcolm Slaney and Michael Casey. Locality-sensitive hashing for finding nearest neighbors [lecture notes]. Signal Processing Magazine, IEEE, 25(2): pp. 128-131, 2008.

Mayur Datar, Nicole Immorlica, Piotr Indyk, and Vahab S Mirrokni. Locality-sensitive hashing scheme based on p-stable distributions. In Proceedings of the twentieth annual symposium on Computational geometry, pp. 253-262. ACM, 2004.

Moses S. Charikar. Similarity estimation techniques from rounding algorithms. In Proceedings of the thirty-fourth annual ACM symposium on Theory of computing, pp. 380-388. ACM, 2002.

Nakul Verma, Samory Kpotufe, and Sanjoy Dasgupta. Which spatial partition trees are adaptive to intrinsic dimension? In Proceedings of the Twenty-Fifth Conference on Uncertainty in Artificial Intelligence , pp. 565-574. AUAIPress, 2009.

Sanjoy Dasgupta and Yoav Freund. Random projection trees and low dimensional manifolds. In Proceedings of the fortieth annual ACM symposium on Theory of computing, pp. 537-546. ACM, 2008.

Saša Petrović, Miles Osborne, and Victor Lavrenko. The Edinburgh Twitter corpus. In Proceedings of the NAACL HLT 2010 Workshop on Computational Linguistics in a World of Social Media , WSA '10, pp. 25-26, Los Angeles,USA, 2010.

Sean Moran, Victor Lavrenko, and Miles Osborne. Variable bit quantisation for lsh. In Proceedings of the 51st Annual Meeting of the Association for Computational Linguistics (vol. 2: Short Papers), pp. 753-758, Sofia,Bulgaria, Aug. 2013.

Yadong Mu, Ju Sun, Tony X. Han, Loong-Fah Cheong, and Shuicheng Yan. Randomized locality sensitive vocabularies for bag-of-features model. In the 11th European Conference on Computer Vision, 14 pages, Sep. 2010.

Zhiyuan Cheng, James Caverlee, and Kyumin Lee. You are where you tweet: a content-based approach to geo-locating Twitter users. In Proceedings of the 19th ACM Conference on Information and Knowledge Management (CIKM 2010), pp. 759-768, Toronto, Canada.

\* cited by examiner

DATA-DEPENDENT CLUSTERING OF GEOSPATIAL WORDS

BACKGROUND

The present disclosure relates to data processing, and more particularly, to methods, systems and computer program products for data-dependent clustering of geospatial words.

Geotagging is the process of adding geographical identification metadata to various media such as a photograph or video, websites, SMS messages, QR Codes, RSS feeds, or social media posts. Modelling the geospatial pattern of these words may help to disambiguate different locations. One challenging issue of such an approach is that millions of unique token types (e.g., on top of words found in a typical English dictionary) in social media lead to computational issues (e.g., hashtags (#GreatBarrierReef), word combinations (lolmythesis), and user handles (@melb). For example, geotagging assigns geographical information to existing objects. Due to limited reliable geographical information (e.g., GPS labelled data), many geotagging systems in social media (e.g., Twitter) rely on text messages to infer geographical locations. For instance, a post on Twitter may state, "yinz need to meet these folks—http://luv-water.co/—they are also a CMU startup and super nice" suggests that the Twitter message refers to Pittsburgh, Pa. because "yinz" and "CMU" are primarily used in Pittsburgh.

SUMMARY

In accordance with an embodiment, a method for data-dependent clustering of geospatial words is provided. The method may include obtaining a matrix of words and locations; generating a plurality of locality-sensitive hash (LSH) functions; generating a plurality of sparse row vectors, wherein each of the sparse row vectors corresponds to a word from the matrix; generating a plurality of sparse LSH functions based on the plurality of LSH functions; and determining a clustering bucket from a plurality of clustering buckets for each of the plurality of sparse row vectors using the sparse LSH functions.

In another embodiment, a computer program product may comprise a non-transitory storage medium readable by a processing circuit and storing instructions for execution by the processing circuit for performing a method that may include obtaining a matrix of words and locations; generating a plurality of locality-sensitive hash (LSH) functions; generating a plurality of sparse row vectors, wherein each of the sparse row vectors corresponds to a word from the matrix; generating a plurality of sparse LSH functions based on the plurality of LSH functions; and determining a clustering bucket from a plurality of clustering buckets for each of the plurality of sparse row vectors using the sparse LSH functions.

In another embodiment, a system for optimizing persistency using hybrid memory may include a processor in communication with one or more types of memory. The processor may be configured to obtain a matrix of words and locations; generate a plurality of locality-sensitive hash (LSH) functions; generate a plurality of sparse row vectors, wherein each of the sparse row vectors corresponds to a word from the matrix; generate a plurality of sparse LSH functions based on the plurality of LSH functions; an determine a clustering bucket from a plurality of clustering buckets for each of the plurality of sparse row vectors using the sparse LSH functions.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for data-dependent clustering of geospatial words are provided. The methods and systems described herein are directed to increasing the efficiency of geotagging social media posts. Although this disclosure is directed to geospatial word clustering in social media, the systems and methods described herein may be applicable in other context. In some embodiments, the clustering may be formulated as row vectors using column-index features in the same space. Examples of other applications may include document and image clustering.

Previous methods of geotagging social media posts involved grouping words with similar geospatial distributions into clusters by constructing a matrix M, in which rows and columns represent word types ($\{w\ i: i \in 1, \ldots, n\}$) and locations ($\{1\ j: i \in d\}$). Pairwise word similarities are calculated using a selected distance measure (e.g., cosine or Jaccard) defined on row vectors (i.e., d locations). Word pairs with the highest similarity are then merged as a cluster, and the elements in each vector are added up in a pairwise manner as the cluster location vector. This iterative merging process continues until no pairs have larger than a predefined similarity threshold. The merged clusters are then used in geotagging modelling and inference (e.g., by mapping word types into cluster labels and using cluster labels as features in training and prediction). Overall, this procedure takes $O(n^3 d)$ computational complexity, and $O(nd)$ in storage.

Many methods make use of a series of randomized hash functions to project words from high dimensional d space to a much smaller k dimensional "signatures" (i.e., a bit array of size k) such that words with similar signatures are more similar than words with different signatures. Words with the same signature are then considered as a cluster or categorized into clustering buckets. Such techniques are often called Locality-Sensitive Hashing (LSH). Hashing row vectors for all words takes $O(ndk)$ computational complexity, which is $n^2/k$ times faster than the previous naive approach. Given that $k \ll n$, this method improves system efficiency by a large margin in practice. The size of k controls the granularity of clustering. When k is large, the computational cost of $O(nkd)$ becomes expensive. However, if k is not sufficiently large, clusters may be under-partitioned—clusters may contain words that can be further divided into sub-clusters. For instance, a cluster may contain Melbourne, Sydney and Brisbane, but they can be further divided on basis of cities. This is partly because LSHs are often randomly generated, and some LSH functions are not able to effectively separate row (word) vectors. As a result, words that are indicative of different locations may have the same "signature". This dilemma often makes LSH-based methods to trade-off between computational cost and clustering quality. To tackle this issue, we introduce a randomized and yet data-dependent LSH generation method, which enables large number of LSH functions (i.e., large k) without incurring high LSH computational cost.

Locality-sensitive hashing is widely used for practical high dimensional and large-scale problems. The basic idea behind LSH is to project the data into a low-dimensional binary space (e.g., each data point is mapped to a k-bit vector, called the signature). Similar input items are mapped to the same cluster with high probability.

By clustering words in social media relative to their geospatial distribution patterns, geotagging modelling and inference based on clusters may gain substantial computational efficiency at the cost of minor accuracy decline. The systems and method described herein are directed at a set of randomized and data-dependent hash functions. Randomized and fixed number samplings are leveraged to obtain sparse row vectors from the word-location matrix, and then boolean "AND" operations are performed on existing randomly generated LSH functions using the sparse row vectors. This results in a new set of sparse LSH functions. The new LSH functions may have some important features. First, the random sampling during the whole process ensures unbiased sampling on the data e.g., the correctness of LSH-based methods), and the sampling result is data-dependent. Second, the sparse LSH functions focus on principal location dimensions and hashing words becomes faster with the distance approximately preserved.

In some embodiments, the systems and methods described herein are directed a transformation of word and location data for generating a set of sparse, randomized and yet data-dependent LSH functions. The systems and methods described herein may use randomized data-dependent dominant dimension selection to reduce LSH computational cost (d→d'). Longer LSH signatures may be used to cluster words more accurately, due to the decreased cost of sparse LSH functions (e.g., increase the number of LSH functions (k→k') to improve the cluster quality. Clustering data may be tuned relative to computational capacity by using parameters such as "signature" length (e.g., k') and sampling size (e.g., d'). The systems and methods described herein are scalable because the matrix may be partitioned horizontally and parallel new randomized LSH computations during clustering because each word vector and randomized LSH are independent of others.

Figure 1:
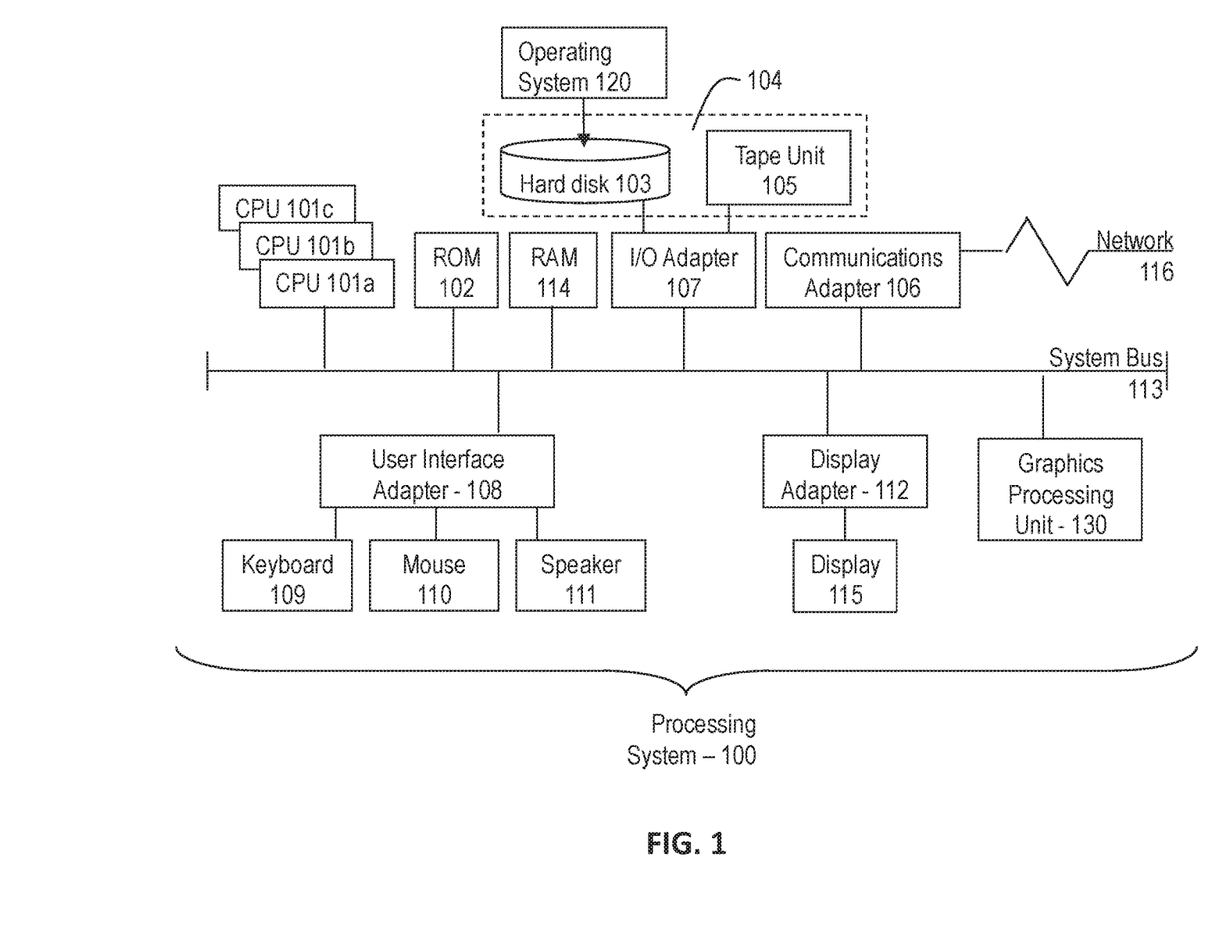
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
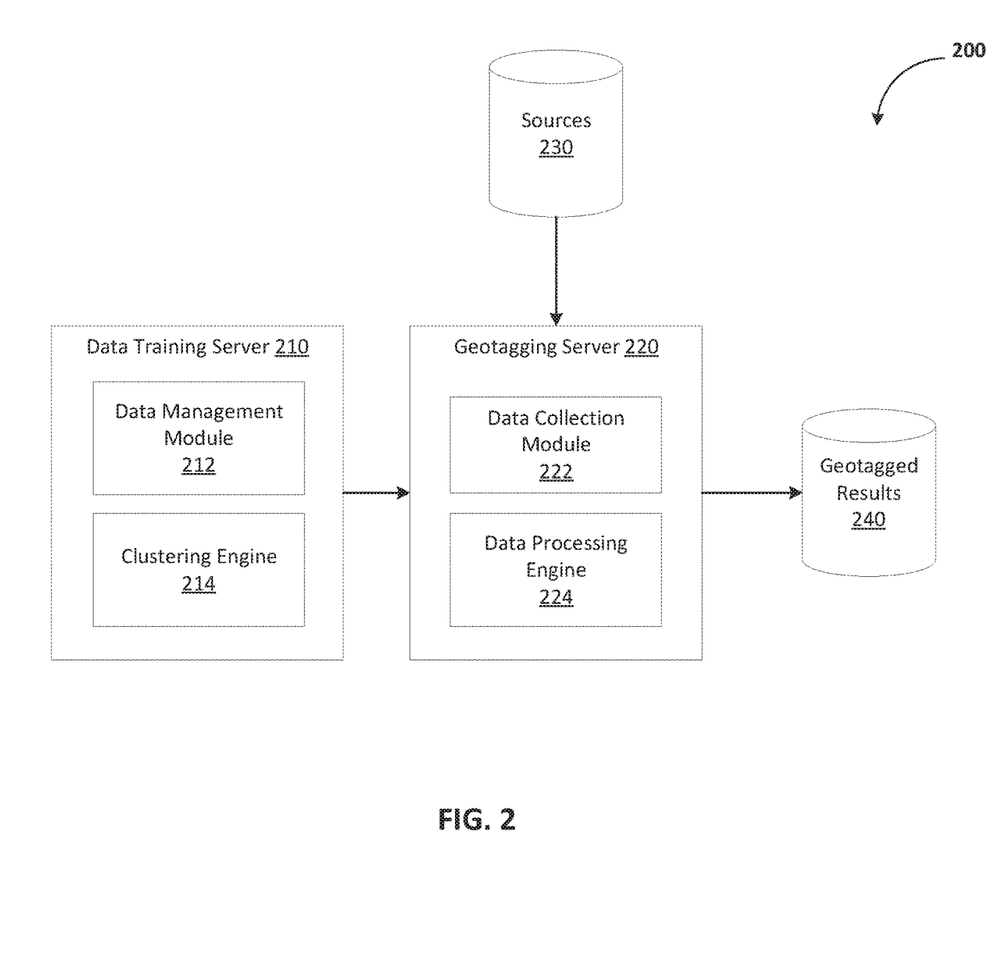
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, a data training server 210, a geotagging server 220, one or more sources 230, and a geotagged results data store 240. Although FIG. 2 depicts a data training server 210 and a geotagging server 210, any of the functions or computational tasks described herein may or may not be distributed across a number of servers (e.g., potentially using a parallel framework, such as Apache Spark or Apache Hadoop). FIG. 2 is intended for explanatory purposes and does not intend to limit the systems and methods described herein.

In some embodiments, the data training server 210 may maybe any type of computing device, such as a desktop, a laptop, a server, or the like. Data training server 210 may include a data management module 212 and a clustering engine 214. The data management module 212 may include computer-readable instructions that in response to execution by the processor(s) 101 cause operations to be performed including obtaining a matrix of words and locations. In some embodiments, the data management module 212 may generate the matrix based on data received by the data management module 212. In some embodiments, the data management module 212 may obtain the matrix. The data management module 212 may transmit the matrix to the clustering engine 214.

The clustering engine 214 may include computer-readable instructions that in response to execution by the processor(s) 101 cause operations to be performed including transforming the matrix into sparse row vectors and generating LSH functions. In some embodiments, the clustering engine 214 may generate sparse LSH functions based on the sparse row vectors and the LSH functions. The clustering engine 214 may use the sparse LSH functions to generate a signature for each of the sparse row vectors. The clustering engine 214 may identify a clustering bucket to add the signature corresponding to the sparse row vectors. If there is not a clustering bucket with the same signature, the clustering engine may generate a clustering bucket for the signature and add the word associated with the sparse row vector.

In some embodiments, the geotagging server 220 may maybe any type of computing device, such as a desktop, a laptop, a server, or the like. The geotagging server 220 may include a data collection module 222 and a data processing engine 224. The data collection module 222 may include computer-readable instructions that in response to execution by the processor(s) 101 cause operations to be performed including receiving the clustering buckets (also known as "clusters") from the data training server 210. In some embodiments, the clustering buckets may be remotely stored and the data collection module 222 may receive a link to access the clustering buckets at the remote location. In some embodiments, the data collection module 222 may obtain input data from one or more sources 230. In some embodiments, sources 230 may be one or more datastores. Examples of sources may include a datastore for a social media network or a social media aggregator. The data collection module 222 may obtain input data and may transmit the input data to the data processing engine 224.

The data processing engine 224 may include computer-readable instructions that in response to execution by the processor(s) 101 cause operations to be performed including transforming the input data received from the data collection module 222. In some embodiments, the input data may be transformed into a signature using one or more hash functions. In some embodiments, the data processing engine 224 may compare the generated signature to the clustering buckets. If the signature matches a clustering bucket, then the data processing engine 224 may determine a location associated with the clustering bucket and may geotag the input data based on the determination. The data processing engine 224 may transmit the geotagged input data to a datastore, such as the geotagged results datastore 240. The geotagged results datastore 240 may be accessed by one or other processing systems for further consumption.

Figure 3:
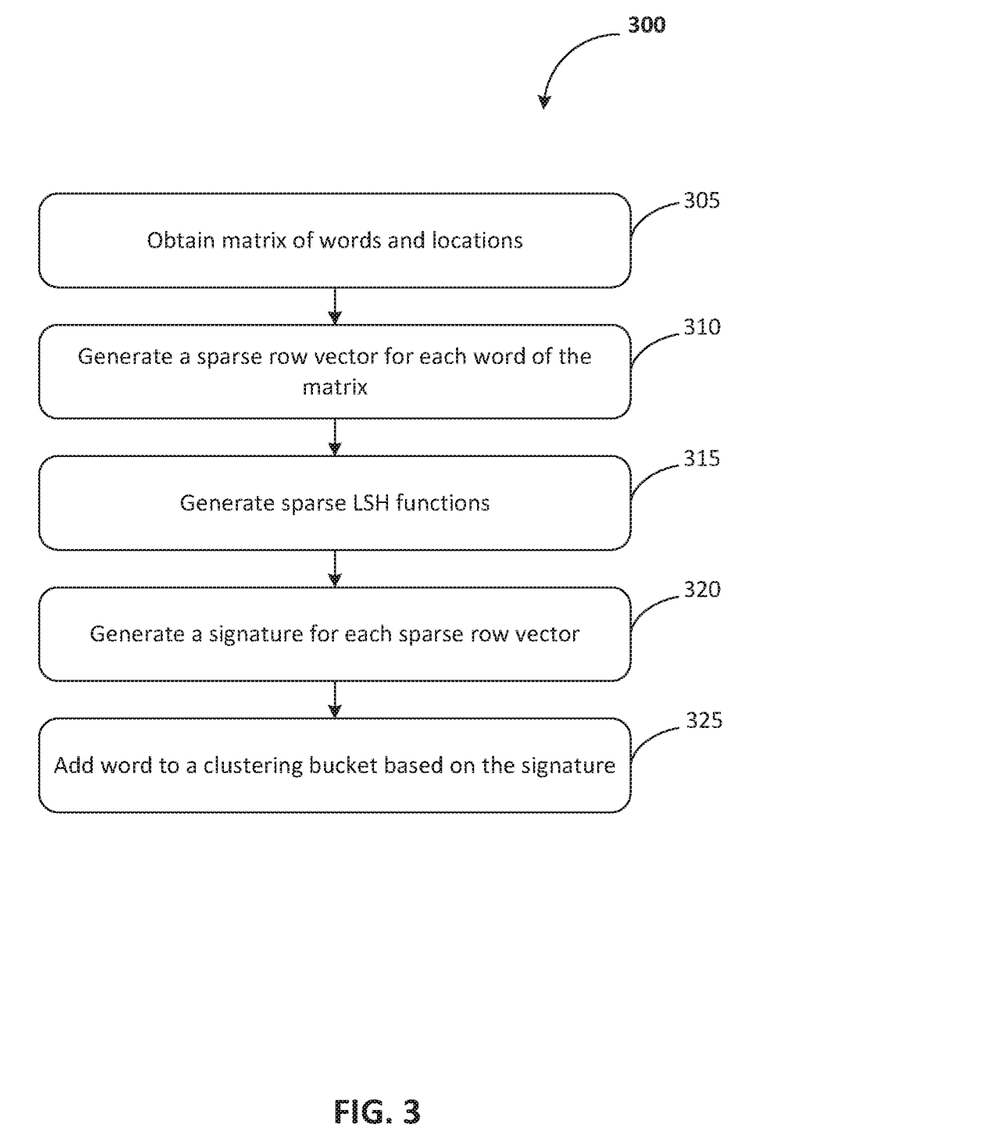
FIG. 3 is a flow diagram of a method for generating data-dependent clusters of geospatial words in accordance with an exemplary embodiment.

Now referring to FIG. 3, a flow diagram of a method 300 for generating data-dependent clusters of geospatial words in accordance with an exemplary embodiment is depicted. At block 305, a matrix of words and locations may be obtained. In some embodiments, the data management module 212 may obtain the matrix. In some embodiments, the data management module 212 may obtain the matrix at periodic time intervals for batch processing. For example, the matrix may be obtained every week, once the matrix has been sufficiently updated. The data management module 212 may transmit the matrix to the clustering engine 214.

In some embodiments, the clustering engine 214 may generate a set of LSH functions using known methods. For instance, the clustering engine 214 may generate random number arrays of size d using Gaussian distributions with $\mu=0$ and $\delta^2=1$. The generated vector may be a randomized hyperplane in $R^d$ space and consists of both positive and negative real values. As a result, its inner product with row vectors in word-location matrix often delivers positive or negative values. A positive value is then mapped to 1 at the corresponding position in the bit signature. Similarly, a negative value is mapped to 0. LSH functions often involve calculating every feature dimensions, which is a non-trivial cost when there are many words and dimensions.

At block 310, a sparse row vector may be generated for each word of the matrix. In some embodiments, the clustering engine 214 may receive the matrix from the data management module 212. The clustering engine 214 may generate a sparse row vector for each for each of the words from the matrix. In some embodiments, the clustering engine 214 may obtain a fixed number for each row of the matrix and generate the sparse row vectors by randomly selecting the fixed number of values from each corresponding row of the matrix.

For each row in the word-location matrix M, a fixed number (d') of location sampling relative to its geospatial distribution is obtained. This preserves the dominant location dimensions and discards less important dimensions. For instance, melb as a lexical variant of Melbourne occurs more frequently in Melbourne, Australia than in Atlanta, Ga. USA. As a result, Melbourne is more likely to be selected in the sample.

At block 315, sparse LSH functions may be generated. In some embodiments, the clustering engine 214 may pair the LSH function with a randomly selected sparse row vector and generate a sparse LSH function by applying an AND Boolean to the LSH function and the randomly selected sparse row vector.

In some embodiments, previous LSH functions are paired with randomly selected sparse row vectors and new LSH functions are generated using boolean "AND" operation (e.g., the original value of is kept if the corresponding dimension in the randomly selected sparse row vector is non-empty, otherwise, the value is set to 0). Each sparse LSH function may require (at most) d' calculations compared with original d dimensions. As a result, the inner product cost between a row vector and a LSH function is substantially reduced.

At block 320, a signature may be generated for each sparse row vector. The clustering engine 214 may generate a vector of length k (e.g., signature) by applying sparse LSH functions to each sparse row vector.

At block 325, the word may be added to a clustering bucket based on the signature. The clustering engine 214 may compare the signature for each sparse row vector to clustering buckets and may add the word corresponding to the signature to the clustering bucket based on the similarity between the signature of the sparse row vector and the signature associated with the clustering bucket.

In some embodiments, the systems and methods described herein compensate the cost of using more LSH functions by reducing single hashing cost (e.g., using a large number of sparse LSH functions). The clustering computational cost O(ndk) is then reduced to O(nd'k'), in which the d'<d and k'>k. Due to the use of more hashing functions, the under-division of clusters becomes less an issue. Large clusters are likely to be further divided by using longer "signatures" if sub-clusters exist.

In some embodiments, the clustering engine 214 may receive an indication to improve the clustering bucket quality. The clustering engine 214 may increase the number of sparse LSH functions to be applied in clustering the sparse row vectors in response to receiving the indication.

Figure 4:
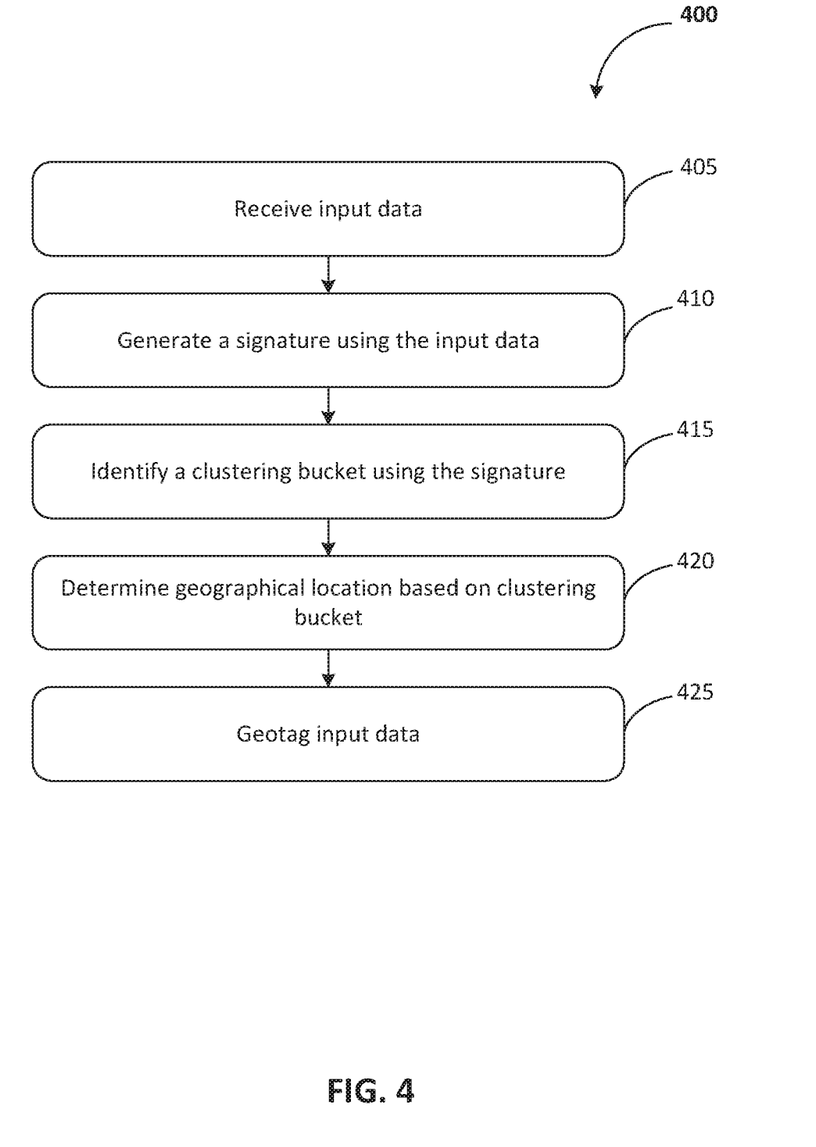
FIG. 4 is a flow diagram of a method for geotagging data using data-dependent clusters of geospatial words.

Now referring to FIG. 4, a flow diagram of a method for 400 geotagging data using data-dependent clusters of geospatial words is depicted.

At block 405, input data may be received. In some embodiments, the data collection module 222 may receive and/or obtain the input data. In some embodiments, the input data may be received from one or more sources 230. The data collection module 222 may transmit the input data to the data processing engine 224.

At block 410, a signature may be generated using the input data. In some embodiments, the data processing engine 224 may receive the input data from the data collection module 222 and may generate a vector of length k, known as a signature. The signature may be generated using sparse hash functions received from the data training server 210. In some embodiments, the data training server 210 may also provide the predetermined length of the signature (e.g., k). In some embodiments, each data point of the input data may be mapped to the signature using the sparse hash functions.

At block 415, a clustering bucket may be identified using the signature. The data processing engine 224 may compare the signature to a signature associated with the clustering buckets to identify a match or to determine the signatures are similar.

At block 420, a geographical location may be determined based on the clustering bucket. In some embodiments, the data processing engine 224 may obtain the geographical location associated with the clustering bucket based on the metadata associated with the clustering bucket. In some embodiments, the data processing engine 224 may obtain the geographical location associated with the clustering bucket by using a table or other data structure to identify a location corresponding to the clustering bucket.

At block 425, the input data may be geotagged. In some embodiments, the data processing engine 224 may associate the input data with the geographical location associated with the clustering bucket. In some embodiments, the data processing engine 224 may transmit the geotagged input data to a datastore, such as a geotagged results datastore 240.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   obtaining a matrix of words and locations;
   generating a locality-sensitive hash (LSH) function;
   identifying a row vector corresponding to a word in the matrix, the row vector comprising a plurality of location dimensions;
   generating a sparse row vector that corresponds to the row vector by performing location sampling relative to a geospatial distribution of the word, wherein performing location sampling comprises selecting a subset of dominant location dimensions from the plurality of location dimensions in the row vector to retain in the sparse row vector and discarding the remaining location dimensions, and wherein selecting a subset of dominant location dimensions comprises determining that the word corresponding to the row vector occurs more frequently in connection with the dominant location dimensions than the discarded remaining location dimensions;
   generating a sparse LSH function using the LSH function and the sparse row vector;
   generating a signature for the sparse row vector using the sparse LSH function;
   determining a clustering bucket to which the signature corresponds;
   adding the word to the clustering bucket,
   receiving input data,
   generating an input signature corresponding to the input data;
   determining that the input signature matches a signature associated with the clustering bucket;
   determining a geographical location from metadata associated with the clustering bucket; and
   geotagging the input data by associating the geographical location with the input data.

2. The computer-implemented method of claim 1, wherein generating the sparse LSH function further comprises:
   pairing the LSH function with the sparse row vector, wherein the sparse row vector is randomly selected; and
   generating the sparse LSH function by applying an AND Boolean to the LSH function and the randomly selected sparse row vector.

3. The computer-implemented method of claim 1, wherein determining the clustering bucket further comprises determining that the generated signature matches a signature associated with the clustering bucket.

4. The computer-implemented method of claim 1, wherein the row vector is a first row vector and the sparse row vector is a first sparse row vector, the method further comprising generating a second sparse row vector, wherein generating the second sparse row vector comprises:
   obtaining a fixed number corresponding to a second row vector of the matrix; and
   generating the second sparse row vector by randomly selecting the fixed number of values from the second row vector.

5. The computer-implemented method of claim 1, further comprising:
   receiving an indication to improve clustering bucket quality; and
   increasing a number of sparse LSH functions.

6. The computer-implemented method of claim 1, further comprising:
   obtaining the matrix at periodic time intervals.

7. A computer program product comprising a non-transitory storage medium readable by a processing circuit and storing instructions for execution by the processing circuit for performing a method comprising:
   obtaining a matrix of words and locations;
   generating a locality-sensitive hash (LSH) function;
   identifying a row vector corresponding to a word in the matrix, the row vector comprising a plurality of location dimensions;
   generating a sparse row vector that corresponds to the row vector by performing location sampling relative to a geospatial distribution of the word, wherein performing location sampling comprises selecting subset of dominant location dimensions from the plurality of location dimensions in the row vector to retain in the sparse row vector and discarding the remaining location dimensions, and wherein selecting a subset of dominant location dimensions comprises determining that the word corresponding to the row vector occurs more frequently in connection with the dominant location dimensions than the discarded remaining location dimensions;
   generating a sparse LSH function using the locality-sensitive LSH and the sparse row vector;
   generating a signature for the sparse row vector using the sparse LSH function;
   determining a clustering bucket to which the signature corresponds;
   adding the word to the clustering bucket,
   receiving input data, generating an input signature corresponding to the input data;

determining that the input signature matches a signature associated with the clustering bucket;

determining a geographical location from metadata associated with the clustering bucket; and geotagging the input data by associating the geographical location with the input data.

8. The computer program product of claim 7, wherein generating the sparse LSH function further comprises:

pairing the LSH function with the sparse row vector, wherein the sparse row vector is randomly selected; and generating the sparse LSH function by applying an AND Boolean to the LSH function and the randomly selected sparse row vector.

9. The computer program product of claim 7, wherein determining the clustering bucket further comprises determining that the generated signature matches a signature associated with the clustering bucket.

10. The computer program product of claim 7, wherein the row vector is a first row vector and the sparse row vector is a first sparse row vector, the method further comprising generating a second sparse row vector, wherein generating the second sparse row vector comprises:

obtaining a fixed number corresponding to a second row vector of the matrix; and generating the second sparse row vector by randomly selecting the fixed number of values from the second row vector.

11. The computer program product of claim 7, wherein the method further comprises:

receiving an indication to improve clustering bucket quality; and increasing a number of sparse LSH functions.

12. The computer program product of claim 7, wherein the method further comprises:

obtaining the matrix at periodic time intervals.

13. A system, comprising:

a processor in communication with one or more types of memory, the processor configured to:

obtain a matrix of words and locations;

generate a locality-sensitive hash (LSH) function;

identify a row vector corresponding to a word in the matrix, the row vector comprising a plurality of location dimensions;

generate a sparse row vector that corresponds to the row vector by performing location sampling relative to a geospatial distribution of the word, wherein performing location sampling comprises selecting a subset of dominant location dimensions from the plurality of location dimensions in the row vector to retain in the sparse row vector and discarding the remaining location dimensions and wherein selecting a subset of dominant location dimensions comprises determining that the word corresponding to the row vector occurs more frequently in connection with the dominant location dimensions than the discarded remaining location dimensions;

generate a sparse LSH function using the locality-sensitive LSH and the sparse row vector;

generating a signature for the sparse row vector using the sparse LSH function;

determine a clustering bucket to which the signature corresponds; and add the word to the clustering bucket;

receive input data;

generate an input signature corresponding to the input data;

determine that the input signature matches a signature associated with the clustering bucket;

determine a geographical location from metadata associated with the clustering bucket; and geotag the input data by associating the geographical location with the input data.

14. The system of claim 13, wherein to generate the sparse LSH function, the processor is further configured to:

pair the LSH function with the sparse row vector, wherein the sparse row vector is randomly selected; and generate the sparse LSH function by applying an AND Boolean to the LSH function and the randomly selected sparse row vector.

15. The system of claim 13, wherein to determine the clustering bucket, the processor is further configured to determine that the generated signature matches a signature associated with the clustering bucket.

16. The system of claim 13, wherein the row vector is a first row vector and the sparse row vector is a first sparse row vector, and wherein the processor is further configured to generate a second sparse row vector by:

obtaining a fixed number corresponding to a second row vector of the matrix; and generating the second sparse row vector by randomly selecting the fixed number of values from the second row vector.

17. The system of claim 13, wherein the processor is further configured to:

receive an indication to improve clustering bucket quality; and increase a number of sparse LSH functions.

* * * * *